United States Patent [19]
Ngoc

[11] Patent Number: 6,077,903
[45] Date of Patent: Jun. 20, 2000

[54] CONTINUOUS PROCESS FOR PRODUCING RUBBERY POLYMER

[75] Inventor: Hung Dang Ngoc, Limiel Brevannes, France

[73] Assignee: The Goodyear Tire Rubber Company, Aakron, Ohio

[21] Appl. No.: 09/076,289

[22] Filed: May 12, 1998

[51] Int. Cl.$^7$ .............................. C08F 267/00; C08F 2/24
[52] U.S. Cl. ............................ 525/53; 525/243; 525/261; 525/262; 525/304; 525/305; 525/309; 525/380; 526/66; 526/88; 526/225; 528/488; 528/490; 528/491; 528/502 R
[58] Field of Search .............................. 525/53, 243, 261, 525/262, 304, 305, 309, 380; 526/66, 88, 225; 528/488, 490, 491, 502 R

[56] References Cited

U.S. PATENT DOCUMENTS

| | | | |
|---|---|---|---|
| 5,380,785 | 1/1995 | Ngoc et al. | 524/504 |
| 5,504,160 | 4/1996 | Ngoc et al. | 525/274 |
| 5,616,651 | 4/1997 | Nino et al. | 525/305 |
| 5,674,933 | 10/1997 | Ngoc et al. | 524/504 |
| 5,773,519 | 7/1998 | Ito et al. | 525/304 X |

*Primary Examiner*—Fred Teskin
*Attorney, Agent, or Firm*—Alvin T Rockhill

[57] ABSTRACT

There is a need for polymers which are utilized in automotive interiors which offer increased heat and ultraviolet light resistance. It is particularly critical for polymers which are utilized in making skin compounds for automotive instrument and door panels to display excellent heat and ultraviolet light resistance. This invention discloses a continuous process for preparing a rubbery polymer which can be blended with polyvinyl chloride to make leathery compositions having good heat and ultraviolet light resistance. This technique involves utilizing a multiple continuous reactor system wherein a first phase monomer solution containing butyl acrylate, an acrylic monomer, acrylonitrile and a crosslinking agent is continuously charged into at least three initial reactors. To attain a small particle size, it is necessary to limit the solids content in each of these initial reactors. Then, a second phase monomer solution containing styrene, additional acrylonitrile and additional crosslinking agent is continuously charged into a subsequent reactor. This technique can also be utilized to synthesize core/shell or IPN structures by using multistage emulsion polymerization in which the first stage latex contains a majority of the butyl acrylate with a small latex particle size being obtained.

27 Claims, No Drawings

CONTINUOUS PROCESS FOR PRODUCING RUBBERY POLYMER

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility.

The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/NBR blends which are utilized as skins for automotive interior panels. However, the degree to which the aging characteristics of such blends can be improved by the addition of additives is limited. In fact, there is a demand for performance characteristics in such applications which heretofore has not been realized by the utilization of heat and light stabilizers. For instance, it would be highly desirable for the skins used in automotive panels to resist discoloration and cracking under conditions of high heat and intense ultraviolet light throughout the life of the vehicle.

NBR/PVC blends offer an array of physical properties which make them useful as a skin composition for automotive panels. The NBR acts as a permanent flexibilizing monomer for the PVC. It also acts as a shrinkage control agent and embossing aid and improves grain retention. The NBR in such blends further provides vacuum forming gauge control and exhibits low fog characteristics. NBR is highly compatible with PVC and has the capability of being recycled. It is essential for any polymer which is substituted for NBR to display these essential characteristics.

U.S. Pat. No. 5,380,785 discloses a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent.

U.S. Pat. No. 5,380,785 further reveals a process for preparing a rubbery polymer which can be blended with polyvinyl chloride to make leathery compositions having good heat and ultraviolet light resistance, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex; (2) adding (a) styrene, (b) additional acrylonitrile and (c) additional crosslinking agent to the seed polymer containing latex under emulsion polymerization conditions which result in the formation of an emulsion containing the rubbery polymer; and (3) recovering the rubbery polymer from the emulsion containing the rubbery polymer. The process disclosed by U.S. Pat. No. 5,380,785 for synthesizing this rubbery polymer is a batch and semi-continuous process.

U.S. Pat. No. 5,616,651 discloses a technique for deodorizing the latex of such rubbery polymers by treatment with an aminoalcohol. U.S. Pat. No. 5,616,651 more specifically reveals a process for preparing a rubbery polymer which can be blended with polyvinyl chloride to make leathery compositions having good heat and ultraviolet light resistance, said process comprising the steps of (1) polymerizing (a) butyl acrylate, (b) at least one member selected from the group consisting of methyl methacrylate, ethyl methacrylate, methyl acrylate and ethyl acrylate, (c) acrylonitrile, (d) a crosslinking agent and (e) a half ester maleate soap under emulsion polymerization conditions to produce a seed polymer containing latex; (2) adding (a) styrene, (b) additional acrylonitrile and (c) additional crosslinking agent to the seed polymer containing latex under emulsion polymerization conditions which result in the formation of an emulsion containing the rubbery polymer; (3) adding an aminoalcohol to the emulsion containing the rubbery polymer; and (4) recovering the rubbery polymer from the emulsion containing the rubbery polymer.

U.S. Pat. No. 5,674,933 discloses a low fogging rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent.

U.S. Pat. No. 5,674,933 further discloses a process for preparing rubbery polymer which can be blended with polyvinyl chloride to make leathery compositions having good heat and ultraviolet light resistance. This process comprising the steps of (1) polymerizing (a) butyl acrylate, (b) at least one member selected from the group consisting of methyl methacrylate, ethyl methacrylate, methyl acrylate and ethyl acrylate, (c) acrylonitrile, (d) a crosslinking agent and (e) a surfactant selected from the group consisting of sulfonates and sulfate derivatives, (f) a dispersant selected from the group consisting of aromatic formaldehyde condensation products and polycarboxylates, under emulsion polymerization conditions to produce a seed polymer containing latex; (2) adding (a) styrene, (b) additional acrylonitrile and (c) additional crosslinking agent to the seed polymer containing latex under emulsion polymerization conditions which results in the formation of an emulsion containing the rubbery polymer; (3) adding an aminoalcohol to the emulsion containing the rubbery polymer; and (4) recovering the rubbery polymer from the emulsion containing the rubbery polymer. The process for producing the rubbery polymer disclosed in this patent is, of course, a batch and semi-continuous process.

SUMMARY OF THE INVENTION

The present invention relates to a continuous process for synthesizing rubbery polymers which can be blended with PVC to make leathery compositions. These compositions are particularly useful in manufacturing skins for automotive interior panelling. Skin compositions which are made utilizing this rubbery polymer provide a higher level of resistance to heat and ultraviolet light than those made utilizing conventional NBR/PVC blends. The rubbery polymers of this invention also offer low fog characteristics, low odor, shrinkage control and grain retention. They also act as an embossing aid and as a permanent flexibilizing modifier. The rubbery polymers of this invention also have characteristics which make them useful in building gasket applications.

This invention more specifically discloses a process for preparing a rubbery polymer which can be blended with polyvinyl chloride to make leathery compositions having good heat and ultraviolet light resistance, said process comprising continuously carrying out the steps of (1) charging (a) butyl acrylate monomer, (b) at least one acrylate monomer selected from the group consisting of methyl methacrylate, ethyl methacrylate, methyl acrylate and ethyl acrylate, (c) acrylonitrile monomer, (d) a crosslinking agent, (e) a sulfonate surfactant, (f) a dispersant selected from the group consisting of aromatic formaldehyde condensation products and polycarboxylates, (g) water and (h) a free radical generator into a first polymerization zone; (2) allowing the monomers to polymerize in the first polymerization zone under emulsion polymerization conditions to a monomer conversion of at least about 80 percent to produce a low solids polymerization medium having a solids content of no more than about 10 percent; (3) charging (a) the low solids polymerization medium, (b) additional butyl acrylate monomer, (c) additional acrylate monomer, (d) additional acrylonitrile monomer and (e) additional crosslinking agent into a second polymerization zone; (4) allowing the monomers to polymerize in the second polymerization zone under emulsion polymerization conditions to a monomer conversion of at least about 80 percent to produce an intermediate solids polymerization medium having a solids content of no more than about 20 percent; (5) charging (a) the intermediate solids polymerization medium, (b) additional butyl acrylate monomer, (c) additional acrylate monomer, (d) additional acrylonitrile monomer and (e) additional crosslinking agent into a third polymerization zone; (6) allowing the monomers to polymerize in the third polymerization zone under emulsion polymerization conditions to a monomer conversion of at least about 80 percent to produce a high solids polymerization medium having a solids content of no more than about 30 percent; (7) charging (a) the high solids polymerization medium, (b) styrene, (c) additional acrylonitrile and (d) additional crosslinking agent into a fourth polymerization zone; (8) allowing the monomers to polymerize in the fourth polymerization zone under emulsion polymerization conditions to a monomer conversion of at least about 80 percent to produce an emulsion containing the rubbery polymer; and (9) recovering the rubbery polymer from the emulsion containing the rubbery polymer.

The subject invention further discloses a process for preparing a rubbery polymer which can be blended with polyvinyl chloride to make leathery compositions having good heat and ultraviolet light resistance, said process comprising continuously carrying out the steps of (1) charging (a) butyl acrylate monomer, (b) at least one acrylate monomer selected from the group consisting of methyl methacrylate, ethyl methacrylate, methyl acrylate and ethyl acrylate, (c) acrylonitrile monomer, (d) a crosslinking agent, (e) a sulfonate surfactant, (f) a dispersant selected from the group consisting of aromatic formaldehyde condensation products and polycarboxylates, (g) water and (h) a free radical generator into a first polimerization zone; (2) allowing the monomers to polymerize in the first polymerization zone under emulsion polymerization conditions to a monomer conversion of at least about 80 percent to produce a low solids polymerization medium having a solids content of no more than about 10 percent; (3) charging (a) the low solids polymerization medium, (b) additional butyl acrylate monomer, (c) additional acrylate monomer, (d) additional acrylonitrile monomer and (e) additional crosslinking agent into a second polymerization zone; (4) allowing the monomers to polymerize in the second polymerization zone under emulsion polymerization conditions to a monomer conversion of at least about 80 percent to produce an intermediate solids polymerization medium having a solids content of no more than about 20 percent; (5) charging (a) the intermediate solids polymerization medium, (b) additional butyl acrylate monomer, (c) additional acrylate monomer, (d) additional acrylonitrile monomer and (e) additional crosslinking agent into a third polymerization zone; (6) allowing the monomers to polymerize in the third polymerization zone under emulsion polymerization conditions to a monomer conversion of at least about 80 percent to produce a high solids polymerization medium having a solids content of no more than about 30 percent; (7) charging (a) the high solids polymerization medium, (b) styrene, (c) additional acrylonitrile and (d) additional crosslinking agent into a fourth polymerization zone; (8) allowing the monomers to polymerize in the fourth polymerization zone under emulsion polymerization conditions to a monomer conversion of at least about 80 percent to produce an emulsion containing the rubbery polymer; (9) adding an aminoalcohol to the emulsion containing the rubbery polymer; and (10) recovering the rubbery polymer from the emulsion containing the rubbery polymer.

DETAILED DESCRIPTION OF THE INVENTION

Rubbery polymers which can be blended with polyvinyl chloride to make leathery compositions having good heat and ultraviolet light resistance can be synthesized by a continuous free radical emulsion polymerization process utilizing the technique of this invention. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate, or ethyl acrylate, (c) acrylonitrile, (d) styrene and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units which are derived from those monomers.

The rubbery polymers of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

The rubbery polymers of this invention will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene and (e) from about 1 weight percent to about 3 weight percent of a crosslinking agent. The percentages reported in this paragraph are based upon the total weight of the rubbery polymer.

The rubbery polymers of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, a sulfonate surfactant and a dispersant selected from the group consisting of aromatic formaldehyde condensation products and polycarboxylates. The reaction mixture utilized in this polymerization technique will normally contain from about 10 weight percent to about 80 weight percent monomers based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.1 phm (parts per hundred parts of monomer by weight) to about 5 phm of at least one member selected from the group consisting of metal salts of alkyl sulfates and metal salts of alkyl sulfonates and from about 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate and from about 0.4 phm to about 3.5 phm of the dispersant selected from the group consisting of aromatic formaldehyde condensation products and polycarboxylates.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water-soluble peroxygen-free radical initiators are especially useful in such aqueous polymerizations.

The emulsion polymerizations of this invention are typically carried out at the temperature ranging between about 60° F. (20° C.) and 212° F. (100° C.). At temperatures above about 38° C., alkyl acrylate monomers (such as butyl acrylate) have a tendency to boil. Thus, a pressurized jacket would be required for heating such alkyl acrylate monomers to temperatures in excess of about 88° C. On the other hand, at polymerization temperatures of less than about 55° C., a redox initiator system is required to insure satisfactory polymerization rates.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates and divinylbenzene. A particularly useful crosslinking agent is 1,4-butanediol dimethacrylate.

The sulfonate surfactants that are useful in this invention are commercially available from a wide variety of sources. For instance, DuPont sells sodium alkylarylsulfonate under the tradename Alkanol™, Browning Chemical Corporation sells sodium dodecylbenzene sulfonates under the tradename Ufaryl™ Dl-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred.

Sodium salts of alkylbenzene sulfonates have the structural formula:

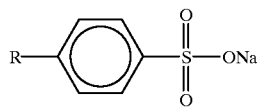

wherein R represents an alkyl group containing from 1 to about 20 carbon atoms. It is preferred for the alkyl group to contain from about 8 to about 14 carbon atoms.

The sulfonate surfactant can be a mixture of (mono) dialkylate ether disulfonates. The advantage of the disulfonate structure is that it contains two ionic charges per molecule instead of one as is the case with conventional alkyl sulfonate surfactants. Mixtures of (mono) dialkylate ether disulfates which are useful in the practice of this invention are commercially available from a wide variety of sources. For instance, Dow Chemical sells Dowfax™ alkylated disulfonated diphenyl oxides which are of the structural formula:

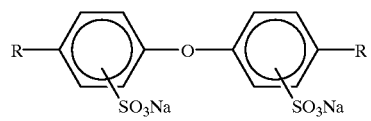

wherein R is an alkyl group which is typically $-C_6H_{13}$, $-C_{10}H_{21}$, $-C_{12}H_{25}$ or $-C_{16}H_{33}$. Sodium mono- and di-dodecyldiphenyloxide disulfonates are sold by American Cyanamide as DPOS-45 surfactants. Alpha-olefin sulfonate surfactants which are suitable for utilization in this invention are commercially available from Witco and Hoechst AG.

The sulfonate surfactants which are useful in the practice of this invention include metal salts of alkylsulfates having the structural formula $ROSO_3X$ and metal salts of alkylethersulfates having the structural formula $RO(CH_2CH_2O)_nSO_3X$, wherein X represents a Group Ia metal, such as sodium or potassium. Sodium lauryl sulfate, sodium ethanolamine lauryl sulfate and triethanolamine lauryl sulfate are representative examples of commercially available sulfate surfactants.

The dispersants utilized in the polymerizations of this invention are normally either aromatic formaldehyde condensation products or polycarboxylates. The aromatic formaldehyde condensation products are normally polysulfonates which are the reaction product of aromatic compounds and formaldehyde. Such aromatic formaldehyde condensation product soaps can be made by a relatively simple process. For example, in such a process, 200 parts of naphthalene is reacted with 200 parts of 98 percent sulfuric acid for 5 hours at a temperature of about 165° C. The solution made is then subsequently cooled and diluted with 90 parts of water. Then, 107 parts of a 30 percent formaldehyde solution is added and the mixture is stirred for 20 hours at a temperature of about 80° C. Toward the end of this reaction period, the mixture is gradually heated to 100° C. Neutralization is subsequently carried out at 20° C. to 25° C. with about 165 to 180 parts of a 25 percent ammonia solution. The neutralization product is then filtered and, if necessary, dried in a vacuum drier.

Numerous variations of this synthesis are possible and a wide range of aromatic compounds and their derivatives can react with aldehydes, ketones and compounds that eliminate aldehyde groups; for example, (a) dispersants produced by condensation of aromatic sulfonic acids and benzyl chloride or benzoin; (b) dispersants produced by condensation of various alkylarylsulfonic acids with a halogen arylsulfonic acid; (c) dispersants produced by condensation of sulfonated phenols or 2-naphthols with formaldehyde and various nitrogen compounds. Some representative examples of aromatic formaldehyde condensation products are shown in U.S. Pat. No. 5,674,933, the teachings of which are incorporated by reference herein in their entirety.

The carboxylate is also a water-soluble polymeric dispersing agent. For instance, methacrylic acid can be polymerized to yield water-soluble homopolymer which can be employed as a carboxylate dispersant. Copolymers with maleic acid, acrylic acid-maleic acid, maleic acid methylvinyl ether and diisobutylene-maleic acid (DIBMA) are also very useful in the practice of this invention. Carboxylate dispersants are commercially available from a variety of sources.

In the first step of the process of this invention, (a) butyl acrylate monomer, (b) at least one acrylate monomer selected from the group consisting of methyl methacrylate, ethyl methacrylate, methyl acrylate and ethyl acrylate, (c) acrylonitrile monomer, (d) a crosslinking agent, (e) a sulfonate surfactant, (f) a dispersant selected from the group consisting of aromatic formaldehyde condensation products and polycarboxylates, (g) water and (h) a free radical generator is charged into a first polymerization zone. The first polymerization zone will typically be a polymerization reactor that is capable of providing temperature control and agitation.

The monomer mixture charged into the first polymerization zone will typically contain about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile and from about 0.25 weight percent to 6 weight percent of the crosslinking agent. It is typically preferred for the monomeric mixture charged into the first polymerization zone to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent. It is generally more preferred for the monomer mixture charged into the first polymerization zone to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile and from about 1 to about 3 weight percent crosslinking agent.

In the second step of the process of this invention, the monomers charged into the first polymerization zone are allowed to polymerize to a conversion of at least about 80 percent. It is preferred for the monomer conversion reached in the first polymerization zone to be at least about 90 percent with it being more preferred for the monomer conversion reached in the first polymerization zone to be at least about 95 percent.

It is critical to limit the solids content of the latex made in the first reaction zone to a maximum of about 10 percent.

In most cases, the solids content of the latex exiting the first reaction zone will be within the range of about 2 percent to about 10 percent. It is normally preferred to limit the solids content of the latex made in the first reaction zone to a maximum of about 9 percent. In most cases, it is preferred for the solids content of the latex exiting the first reaction zone to be within the range of about 5 percent to about 9 percent. It is normally more preferred to limit the solids content of the latex made in the first reaction zone to a maximum of about 8 percent. In most cases, it is preferred for the solids content of the latex exiting the first reaction zone to be within the range of about 6 percent to about 8 percent. Thus, the polymerization of that takes place in the first polymerization zone results in the formation of a low solids polymerization medium.

The free radical emulsion polymerization carried out in the first polymerization zone will typically be conducted at a temperature which is within the range of about 10° C. to about 95° C. In most cases, the polymerization temperature in the first polymerization zone will be within the range of about 20° C. to about 80° C. It is typically more preferred for the temperature in the first polymerization zone to be within the range of about 40° C. to 60° C.

In the third step of the process of this invention, the low solids polymerization medium and a mixture of (a) butyl acrylate monomer, (b) at least one acrylate monomer selected from the group consisting of methyl methacrylate, ethyl methacrylate, methyl acrylate and ethyl acrylate, (c) acrylonitrile monomer and (d) a crosslinking agent is charged into a second polymerization zone. The second polymerization zone will typically be a polymerization reactor that is capable of providing temperature control and agitation. The second polymerization zone (second reactor) will typically be similar or identical in design to the first polymerization zone (first reactor). The monomer mixture charged into the second polymerization zone will typically be of similar or identical composition to the monomer mixture charged into the first polymerization zone.

In the fourth step of the process of this invention, the monomers charged into the second polymerization zone are allowed to polymerize to a conversion of at least about 80 percent. It is preferred for the monomer conversion reached in the second polymerization zone to be at least about 90 percent with it being more preferred for the monomer conversion reached in the second polymerization zone to be at least about 95 percent.

It is critical to limit the solids content of the latex made in the second reaction zone to a maximum of about 20 percent. In most cases, the solids content of the latex exiting the second reaction zone will be within the range of about 6 percent to about 20 percent. It is normally preferred to limit the solids content of the latex made in the second reaction zone to a maximum of about 19 percent. In most cases, it is preferred for the solids content of the latex exiting the second reaction zone to be within the range of about 12 percent to about 19 percent. It is normally more preferred to limit the solids content of the latex made in the second reaction zone to a maximum of about 18 percent. In most cases, it is preferred for the solids content of the latex exiting the second reaction zone to be within the range of about 14 percent to about 18 percent. Thus, the polymerization that takes place in the second polymerization zone results in the formation of an intermediate solids polymerization medium.

The free radical emulsion polymerization carried out in the second polymerization zone will typically be conducted at a temperature which is within the range of about 15° C. to about 100° C. In most cases, the polymerization temperature in the second polymerization zone will be within the range of about 25° C. to about 85° C. It is typically more preferred for the temperature in the second polymerization zone to be within the range of about 45° C. to 65° C.

In the fifth step of the process of this invention, the intermediate solids polymerization medium and a mixture of (a) butyl acrylate monomer, (b) at least one acrylate monomer selected from the group consisting of methyl methacrylate, ethyl methacrylate, methyl acrylate and ethyl acrylate, (c) acrylonitrile monomer and (d) a crosslinking agent are charged into a third polymerization zone. The third polymerization zone will typically be a polymerization reactor that is capable of providing temperature control and agitation. The third polymerization zone (third reactor) will typically be similar or identical in design to the first polymerization zone (first reactor) and the second polymerization zone (second reactor). The monomer mixture charged into the third polymerization zone will typically be of similar or identical composition to the monomer mixture charged into the first and second polymerization zones.

In the sixth step of the process of this invention, the monomers charged into the third polymerization zone are allowed to polymerize to a conversion of at least about 80 percent. It is preferred for the monomer conversion reached in the third polymerization zone to be at least about 90 percent with it being more preferred for the monomer conversion reached in the third polymerization zone to be at least about 95 percent.

It is critical to limit the solids content of the latex made in the third reaction zone to a maximum of about 30 percent. In most cases, the solids content of the latex exiting the third reaction zone will be within the range of about 12 percent to about 30 percent. It is normally preferred to limit the solids content of the latex made in the third reaction zone to a maximum of about 28 percent. In most cases, it is preferred for the solids content of the latex exiting the third reaction zone to be within the range of about 20 percent to about 28 percent. It is normally more preferred to limit the solids content of the latex made in the third reaction zone to a maximum of about 26 percent. In most cases, it is most preferred for the solids content of the latex exiting the third reaction zone to be within the range of about 22 percent to about 26 percent. Thus, the polymerization of that takes place in the third polymerization zone results in the formation of a high solids polymerization medium.

The free radical emulsion polymerization carried out in the third polymerization zone will typically be conducted at a temperature which is within the range of about 20° C. to about 100° C. In most cases, the polymerization temperature in the third polymerization zone will be within the range of about 30° C. to about 90° C. It is typically more preferred for the temperature in the third polymerization zone to be within the range of about 50° C. to 70° C.

In the seventh step of the process of this invention, the high solids polymerization medium, styrene monomer, additional acrylonitrile monomer and additional crosslinking agent are charged into a fourth polymerization zone. As a general rule, from about 4 parts by weight to about 30 parts by weight of styrene, from about 1 part by weight to about 20 parts by weight of additional acrylonitrile and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile and from about 0.05 parts by weight to 1 part by weight of the crosslinking agent. It is typically more preferred for about 10 parts by weight to about 17 parts by weight of styrene, from about 4 parts by weight to about 8 parts by weight of acrylonitrile and from about 0.1 part by weight to about 0.5 part by weight of the crosslinking agent to be added to the high solids polymerization medium to initiate the second phase of the polymerization.

The free radical emulsion polymerization carried out in the fourth polymerization zone, as the second stage polymerization, will typically be conducted at a temperature which is within the range of about 25° C. to about 100° C. In most cases, the polymerization temperature in the fourth polymerization zone will be within the range of about 35° C. to about 95° C. It is typically more preferred for the temperature in the first polymerization zone to be within the range of about 60° C. to 80° C.

It will generally be advantageous to carry out the second stage polymerization in a series of two or more reactors. By utilizing multiple reactors for carrying out the second stage polymerization, higher conversions and lower residual monomer contents can be attained. It is particularly useful to increase the temperature slightly for reactor to reactor in the second phase of the polymerization. In any case, a final monomer conversion of at least about 90 percent and preferably of at least 95 percent will be attained. It is more preferred for the final monomer conversion to be at least about 99 percent.

After the polymerization has been completed, it is normally desirable to add an aminoalcohol to the emulsion to deodorize the latex. The aminoalcohol will generally be of the structural formula HO-A-NH2 wherein A represents an alkylene group which contains from 2 to about 20 carbon atoms. It is normally preferred for the aminoalcohol to contain from 2 to about 10 carbon atoms with amino alcohols, which contain from 2 to about 5 carbon atoms, being most preferred. Ethanolamine (HO—CH$_2$—CH$_2$—NH$_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butylacrylate and acrylonitrile which is present in the emulsion. This reaction will proceed over a broad temperature range and the deodorizing step can be conducted at any temperature which is within the range of about 5° C. and about 95° C. However, for practical reasons, the deodorizing step will normally be carried out at a temperature which is within the range of about 20° C. to about 70° C. Since the reaction is faster at higher temperatures, the amount of reaction time needed will decrease with increasing temperature. For instance, at a temperature of about 20° C., a residence time in the deodorizing step of one to three days may be required. On the other hand, at a temperature of about 65° C., only about two hours of reaction time is normally required.

The amount of time required for the aminoalcohol to react with the residual n-butylacrylate monomer and residual acrylonitrile monomer will also depend upon the level of aminoalcohol utilized. As a general rule, from about 0.05 weight percent to about 2 weight percent of the aminoalcohol will be added based upon the total weight of the emulsion. More typically, from about 0.1 weight percent to about 1.5 weight percent of the aminoalcohol will be added. It is normally preferred to utilize from about 0.3 weight percent to about 1 weight percent of the aminoalcohol.

The rubbery polymer made by the continuous polymerization process of this invention is recovered from the emulsion (latex) after the optional deodorizing step. This can be accomplished by utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath which will further reduce odor. After being washed, the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent which can be utilized in such applications.

The rubbery polymers made by the process of this invention can be blended with polyvinylchloride to make leather-like compositions. These leathery compositions offer an excellent combination of properties for utilization in making skin compounds for panels used in automotive applications. These leathery compositions can be prepared by blending the rubbery polymer into polyvinylchloride (PVC), utilizing standard mixing techniques. It is highly preferred for the rubbery polymer to be in powdered form when blended into PVC to make such leathery compositions.

A wide variety of plasticizers which are compatible with the polyvinyl chloride resins can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, C7-9 linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain, neopentyl glycol dibenzoate, glyceryl tribenzoate, timethylolethane tribenzoate, pentaerythritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallage, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexyl-epoxy tallate, octyl epoxy stearate; proprietary esters such as proprietary ester and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylate-caprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri(C7-9 alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, triisopropylphenyl phosphate, alkyl aryl phosphates, diphenylxylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate and methoxylethyl acetoxy stearate; sucrose derivatives such as sucrose benzoate; sulfonic acid derivatives such as alkyl-sulfonic esters of phenol; tall oil derivatives such as methylester of tall oil and isooctyl ester of tall oil; and terephthalic acid derivatives such as dioctyl terephthalate.

Such leathery compositions typically contain from about 40 to 160 parts by weight of the rubbery polymer, from about 10 to about 50 parts of a plasticizer and from about 0.1 to about 5 parts by weight of an antidegradant per 100 parts by weight of the polyvinylchloride. It is typically preferred for such leathery compositions to contain from about 60 to about 120 parts by weight of the rubbery polymer, from about 15 to about 40 parts of the plasticizer and from about 0.5 to 3 parts of an antidegradant (per 100 parts of the PVC). It is typically more preferred for the leathery composition to contain from about 70 to about 90 parts by weight of the rubbery polymer, from about 20 to about 30 parts by weight of the plasticizer and from about 1 to 2 parts by weight of the antidegradant per 100 parts by weight of the PVC.

Such compositions will also generally contain an acrylonitrile-butadiene-styrene resin (ABS resin). The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

These leathery compositions are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

The rubbery polymers made by the continuous process of this invention can also be blended with other halogen containing polymers (in addition to PVC), styrenic polymers (polymers which contain styrene, such as acrylonitrile-styrene-acrylate (ASA) polymers), polyolefins and polyamides to produce compositions which exhibit good heat and ultraviolet light resistance. Such polymeric compositions can be used in manufacturing a wide variety of useful articles, such as profiles, moldings, sheeting, flooring, wall coverings, hose, cables and footwear. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons which can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6,12. These nylons will typically have a number average molecular weight which is within the range of about 8,000 to about 40,000 and will more typically have a number average molecular weight which is within the range of about 10,000 to about 25,000. Some representative examples of polyolefins which can be used include linear low density polyethylene, high density polyethylene, polypropylene, polybutylene and modified polyolefins, such as ethylene vinyl acetate (EVA).

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLE 1

In this experiment, a rubbery polymer was made utilizing the continuous polymerization technique of this invention. The polymerization was conducted in a series of six reactors having a capacity of 2 liters. The reactors were equipped with an axially flow turbine agitator which was operated at 110 rpm (revolutions per minute).

An aqueous phase buffer solution which contained 201.1 phm of water, 3 phm of sodium dodecylbenzene sulfonate soap, 3.5 phm of Sokalan™ PM 10I polycarboxylate soap, 0.06 phm of triethanolamine, 0.2 phm of tetrasodium pyrophosphate electrolyte and 0.08 phm of t-dodecylmercaptan was charged into the first reactor at a rate of 12 grams per minute. An initiator solution containing 33.8 phm of water and 0.4 phm of potassium persulfate was also charged into the first reactor at the rate of 2 grams per minute. Finally, a first phase monomer solution containing 71.1 phm of n-butylacrylate, 8.4 phm of acrylonitrile, 4.2 phm of methyl methacrylate and 2.5 phm of 1,4-butanediol dimethacrylate was charged into the first reactor at a rate of 1 grams per minute. This monomer solution was also separately fed into the second and third reactors at a rate of 1 grams per minute. In other words, the first phase monomer solution was split three ways and charged in equal amounts into each of the first three reactors.

A temperature of 50° C. was maintained in the first reactor. The latex made in the first reactor had a solids content of about 8 percent and was continuously fed into the second reactor along with the monomer solution. A temperature of 55° C. was maintained in the second reactor. The latex synthesized in the second reactor had a solids content of about 18 percent and was continuously fed into the third reactor along with the monomer solution. A temperature of 60° C. was maintained in the third reactor. The latex made in the third reactor had a solids content of about 26 percent and was continuously fed into the fourth reactor.

A second phase monomer solution containing 11.2 phm of styrene, 4.8 phm of acrylonitrile, 0.18 phm of divinyl benzene and 0.03 phm of t-dodecylmercaptan was also separately charged into the fourth reactor at a rate of 1 grams per minute. The fourth reactor was maintained at a temperature of 60° C. and the latex made therein was continuously charged into a fifth reactor which was maintained at a temperature of 70° C. The latex made in the fifth reactor was continuously charged into a sixth reactor which was also maintained at a temperature of 70° C. The latex that exited the sixth reactor had a solids content of about 30 percent and an average particle size of about 143 nm.

The latex made was subsequently coagulated and a dry rubber was recovered. The dry rubber was determined to have a Mooney ML 1+4 viscosity at 100° C. of about 47, a Mooney ML 1+4 viscosity at 150° C. of about 23 and a Haake torque (177° C./50 rpm/20 minutes) of about 900 m.g. This experiment shows that the continuous process of this intention can be utilized to make a rubbery polymer having a small latex particle size of less than 150 nm.

Comparative Example 2

In this experiment, the procedure described in Example 1 was repeated except that only a five-reactor chain was utilized. In this experiment, the first phase monomer solution was fed only into the first two reactors at a feed rate of 1.5 grams per minute. However, the latex made utilizing this procedure had an average particle size of over 150 nm.

Comparative Example 3

In this experiment, the procedure described in Example 1 was repeated except that only a four-reactor chain was utilized. In this experiment, the first phase monomer solution was fed only into the first reactor at a feed rate of 3 grams per minute. However, the latex made utilizing this procedure had an average particle size of about 200 nm. This experiment and Comparative Example 2 show the critical nature of splitting the first phase monomer solution between at least three reactors to maintain a satisfactory latex particle size of less than 150 nm.

Example 4

Samples were made by kneading the rubbery polymer synthesized in Example 1 on two roll mills at 50° C. for 6 minutes and compression molding at 150° C. for 10 minutes. Physical testing showed a tensile strength of 7.7 MPa, a modulus of 50 percent elongation of 2.5 MPa, an elongation at break of 415 percent and a tear strength of 25 KN/m. As can be seen from Table I, these physical properties compare favorably to the physical properties of test samples made from Sunigum® 7395 rubber and Sunigum® 7358 rubber using the same procedure.

TABLE I

| Rubbery Polymer | Sunigum ® 7395 | Sunigum ® 7558 | From Ex. 1 |
|---|---|---|---|
| Tensile Strength (MPa) | 6.1 | 7.2 | 7.7 |
| Modulus @ 50% (MPa) | 1.3 | 1.8 | 2.5 |
| Modulus @ 100% (MPa) | 2.9 | 3.3 | 3.4 |
| Elongation @ Break (%) | 320 | 220 | 415 |
| Tear Strength (KN/m) | 17 | 15 | 25 |

Example 5

A leathery composition can be made by blending the rubbery polymer synthesized in Example 1 into PVC resin. This blend can be prepared by blending 100 parts of PVC resin, 40 parts of the rubbery polymer, 50 parts of a plasticizer, 3 parts of a stabilizer. This leathery composition was made by kneading the blend on two roll mills at 180° C. for 6 minutes and then compression molding at 180° C. for 10 minutes. The physical properties of the leathery composition made were determined and compared with leathery compositions made with Sunigum™ 7395 rubber and Sunigum™ 7558 rubber made using the same procedure (see Table II).

TABLE II

| Rubbery Polymer | Sunigum ® 7395 | Sunigum ® 7558 | From Ex. 1 |
|---|---|---|---|
| Shore A Hardness | 78 | 81 | 74 |
| Tensile Strength (MPa) | 17.8 | 17.3 | 16.5 |
| Modulus @ 50% (MPa) | 5.2 | 5.8 | 5.1 |
| Modulus @ 100% (MPa) | 8.0 | 9.1 | 8.2 |
| Elongation @ Break (%) | 290 | 240 | 270 |
| Tear Strength (KN/m) | 60 | 61 | 64 |

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubbery polymer which can be blended with polyvinyl chloride to make leathery compositions having good heat and ultraviolet light resistance, said process comprising continuously carrying out the steps of (1) charging (a) butyl acrylate monomer, (b) at least one acrylate monomer selected from the group consisting of methyl methacrylate, ethyl methacrylate, methyl acrylate and ethyl acrylate, (c) acrylonitrile monomer, (d) a crosslinking agent, (e) a sulfonate surfactant, (f) a dispersant selected from the group consisting of aromatic formaldehyde condensation products and polycarboxylates, (g) water and (h) a free radical generator into a first polymerization zone; (2) allowing the monomers to polymerize in the first polymerization zone under emulsion polymerization conditions to a monomer conversion of at least about 80 percent to produce a low solids polymerization medium having a solids content of no more than about 10 percent; (3) charging (a) the low solids polymerization medium, (b) additional butyl acrylate monomer, (c) additional acrylate monomer, (d) additional acrylonitrile monomer and (e) additional crosslinking agent into a second polymerization zone; (4) allowing the monomers to polymerize in the second polymerization zone under emulsion polymerization conditions to a monomer conversion of at least about 80 percent to produce an intermediate solids polymerization medium having a solids content of no more than about 20 percent; (5) charging (a) the intermediate solids polymerization medium, (b) additional butyl acrylate monomer, (c) additional acrylate monomer, (d) additional acrylonitrile monomer and (e) additional crosslinking agent into a third polymerization zone; (6) allowing the monomers to polymerize in the third polymerization zone under emulsion polymerization conditions to a monomer conversion of at least about 80 percent to produce a high solids polymerization medium having a solids content of no more than about 30 percent; (7) charging (a) the high solids polymerization medium, (b) styrene, (c) additional acrylonitrile and (d) additional crosslinking agent into a fourth polymerization zone; (8) allowing the monomers to polymerize in the fourth polymerization zone under emulsion polymerization conditions to a monomer conversion of at least 80 percent to produce an emulsion containing the rubbery polymer; and (9) recovering the rubbery polymer from the emulsion containing the rubbery polymer.

2. A process for preparing a rubbery polymer which can be blended with polyvinyl chloride to make leathery compositions having good heat and ultraviolet light resistance, said process comprising continuously carrying out the steps of (1) charging (a) butyl acrylate monomer, (b) at least one acrylate monomer selected from the group consisting of methyl methacrylate, ethyl methacrylate, methyl acrylate and ethyl acrylate, (c) acrylonitrile monomer, (d) a crosslinking agent, (e) a sulfonate surfactant, (f) a dispersant selected from the group consisting of aromatic formaldehyde condensation products and polycarboxylates, (g) water and (h) a free radical generator into the first polymerization zone; (2) allowing the monomers to polymerize in the first polymerization zone under emulsion polymerization conditions to a monomer conversion of at least about 80 percent to produce a low solids polymerization medium having a solids content of no more than about 10 percent; (3) charging (a) the low solids polymerization medium, (b) additional butyl acrylate monomer, (c) additional acrylate monomer, (d) additional acrylonitrile monomer and (e) additional crosslinking agent into a second polymerization zone; (4) allowing the monomers to polymerize in the second polymerization zone under emulsion polymerization conditions to a monomer conversion of at least about 80 percent to produce an intermediate solids polymerization medium having a solids content of no more than about 20 percent; (5) charging (a) the intermediate solids polymerization medium, (b) additional butyl acrylate monomer, (c) additional acrylate monomer, (d) additional acrylonitrile monomer and (e) additional crosslinking agent into a third polymerization zone; (6) allowing the monomers to polymerize in the third polymerization zone under emulsion polymerization conditions to a monomer conversion of at least about 80 percent to produce a high solids polymerization medium having a solids content of no more than about 30 percent; (7) charging (a) the high solids polymerization medium, (b) styrene, (c) additional acrylonitrile and (d) additional crosslinking agent into a fourth polymerization zone; (8) allowing the monomers to polymerize in the fourth polymerization zone under emulsion polymerization conditions to a monomer conversion of at least about 80 percent to produce an emulsion containing the rubbery polymer; (9) adding an aminoalcohol to the emulsion containing the rubbery polymer; and (10) recovering the rubbery polymer from the emulsion containing the rubbery polymer.

3. A process as specified in claim 1 wherein a monomer conversion of at least about 90 percent is attained in the polymerizations of steps (2), (4), (6) and (8).

4. A process as specified in claim 3 wherein (a) about 40 weight percent to about 80 weight percent butyl acrylate, or optionally a mixture of butyl acrylate and 2-ethylhexyl acrylate containing up to 40 weight percent 2-ethylhexyl acrylate, (b) about 5 weight percent to about 35 weight percent methyl methacrylate, ethyl methacrylate, methyl acrylate or ethyl acrylate, (c) about 4 weight percent to about 30 weight percent acrylonitrile and (d) about 0.25 weight percent to about 8 weight percent of a crosslinking agent are charged in steps (1), (3) and (5).

5. A process as specified in claim 4 wherein said process as carried out at a temperature which is within the range of about 20° C. to about 100° C.

6. A process as specified in claim 5 wherein the solids content attained in step (2) is within the range of about 2 percent to about 10 percent; wherein the solids content attained in step (4) is within the range of about 6 percent to about 20 percent; and wherein the solids content attained in step (6) is within the range of about 12 percent to about 30 percent.

7. A process as specified in claim 6 wherein about 50 weight percent to about 85 weight percent butyl acrylate, or optionally a mixture of butyl acrylate and 2-ethylhexyl acrylate containing up to about 40 weight percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent are charged in steps (1), (3) and (5).

8. A process as specified in claim 7 wherein the temperature in the first polymerization zone is within the range of about 20° C. to 80° C.; wherein the temperature in the second polymerization zone is within the range of about 25° C. to about 85° C.; wherein the temperature within the third polymerization zone is within the range of about 30° C. to about 90° C.; and wherein the temperature within the fourth polymerization zone is within the range of about 35° C. to about 95° C.

9. A process as specified in claim 8 wherein the solids content attained in step (2) is within the range of about 5 percent to about 9 percent; wherein the solids content attained in step (4) is within the range of about 12 percent to about 19 percent; and wherein the solids content attained in step (6) is within the range of about 20 percent to about 28 percent.

10. A process as specified in claim 9 wherein about 60 weight percent to about 80 weight percent butyl acrylate, or optionally a mixture of butyl acrylate and 2-ethylhexyl acrylate containing up to about 40 weight percent 2-ethylhexyl acrylate, from about 5 weight percent to about 25 weight percent ethyl acrylate, ethyl methacrylate, methyl acrylate or methyl methacrylate, from about 5 weight percent to about 25 weight percent acrylonitrile and from about 1 weight percent to about 3 weight percent of the crosslinking agent are charged in steps (1), (3) and (5).

11. A process as specified in claim 10 wherein the temperature in the first polymerization zone is within the range of about 40° C. to 60° C.; wherein the temperature in the second polymerization zone is within the range of about 45° C. to about 65° C.; wherein the temperature within the third polymerization zone is within the range of about 50° C. to about 70° C.; and wherein the temperature within the fourth polymerization zone is within the range of about 60° C. to about 80° C.

12. A process as specified in claim 11 wherein the solids content attained in step (2) is within the range of about 6 percent to about 8 percent; wherein the solids content attained in step (4) is within the range of about 14 percent to about 18 percent; and wherein the solids content attained in step (6) is within the range of about 22 percent to about 26 percent.

13. A process as specified in claim 2 wherein the aminoalcohol contains from 2 to about 20 carbon atoms.

14. A process as specified in claim 13 wherein the aminoalcohol is allowed to react with residual acrylonitrile and residual n-butylacrylate at a temperature which is within the range of about 5° C. to about 95° C.

15. A process as specified in claim 14 which further comprises washing the rubbery polymer with water after it is recovered from the emulsion.

16. A process as specified in claim 15 wherein from about 0.05 weight percent to about 2 weight percent of the aminoalcohol is added based upon the total weight of the emulsion.

17. A process as specified in claim 16 wherein the aminoalcohol contains from 2 to about 10 carbon atoms.

18. A process as specified in claim 17 wherein the aminoalcohol is allowed to react with residual acrylonitrile and residual n-butylacrylate at a temperature which is within the range of about 20° C. to about 70° C.

19. A process as specified in claim 18 wherein from about 0.1 weight percent to about 1.5 weight percent of the aminoalcohol is added based upon the total weight of the emulsion.

20. A process as specified in claim 19 wherein the aminoalcohol contains from 2 to about 5 carbon atoms.

21. A process as specified in claim 20 wherein from about 0.3 weight percent to about 1 weight percent of the aminoalcohol is added based upon the total weight of the emulsion.

22. A process as specified in claim 21 wherein the aminoalcohol is ethanolamine.

23. A process as specified in claim 1 wherein the crosslinking agent is selected from the group consisting of difunctional acrylates, trifunctional acrylates, difunctional methacrylates, trifunctional methacrylates and divinylbenzene.

24. A process as specified in claim 1 wherein the crosslinking agent utilized in step (1) is 1,4-butanediol dimethacrylate.

25. A process as specified in claim 1 wherein the crosslinking agent utilized in step (2) is divinylbenzene.

26. A process as specified in claim 1 which further comprises washing the recovered rubbery polymer, drying the rubbery polymer after it has been washed and subsequently converting it into a powder.

27. A process as specified in claim 26 wherein the rubbery polymer is converted to a powder in the presence of a partitioning agent selected from the group consisting of calcium carbonate, emulsion polyvinyl chloride and silica.

* * * * *